(12) United States Patent
Rink

(10) Patent No.: US 11,488,497 B2
(45) Date of Patent: Nov. 1, 2022

(54) LINERLESS SELF-ADHESIVE MATERIAL

(71) Applicant: RITRAMA S.p.A., Caponago (IT)

(72) Inventor: Tomas Federico Rink, Caponago (IT)

(73) Assignee: Ritrama S.p.A., Caponago (IT)

( * ) Notice: Subject to any disclaimer, the term of this patent is extended or adjusted under 35 U.S.C. 154(b) by 0 days.

(21) Appl. No.: 16/256,834

(22) Filed: Jan. 24, 2019

(65) Prior Publication Data

US 2019/0156707 A1     May 23, 2019

Related U.S. Application Data

(62) Division of application No. 14/392,189, filed as application No. PCT/IB2014/062623 on Jun. 26, 2014, now Pat. No. 10,229,617.

(30) Foreign Application Priority Data

Jun. 28, 2013  (IT) .......................... MI2013A001087

(51) Int. Cl.
*G09F 3/02*     (2006.01)
*C09J 7/22*     (2018.01)
(Continued)

(52) U.S. Cl.
CPC .............. *G09F 3/02* (2013.01); *B31D 1/021* (2013.01); *B32B 37/025* (2013.01); *B32B 37/06* (2013.01); *B32B 37/12* (2013.01); *B32B 43/006* (2013.01); *C09J 7/22* (2018.01); *C09J 133/00* (2013.01); *C09J 175/04* (2013.01); *C09J 177/00* (2013.01);
(Continued)

(58) Field of Classification Search
CPC ...... G09F 3/02; G09F 3/10; G09F 2003/0232; G09F 2003/0255; C09J 7/22; C09J 133/00; C09J 175/04; C09J 177/00; C09J 2203/334; C09J 2433/00; C09J 2475/00; C09J 2477/00; B31D 1/021; B31D 2201/02; B32B 37/025; B32B 37/06; B32B 37/12; B32B 43/006; B32B 2519/00

See application file for complete search history.

(56) References Cited

U.S. PATENT DOCUMENTS 4,577,204 A     3/1986 Shibata et al.
5,284,688 A *   2/1994 Hiatt ..................... B31D 1/021
                                              427/208.8

(Continued)

FOREIGN PATENT DOCUMENTS

BE        1013273 A3      11/2001
BR     PI0902205-8 A2      3/2011
(Continued)

*Primary Examiner* — Patricia L. Nordmeyer
(74) *Attorney, Agent, or Firm* — Jeffrey N. Townes; Cozen O'Connor

(57) ABSTRACT

The invention concerns a linerless self-adhesive material obtained starting from a self-adhesive material with a liner, by means of a process that comprises the delamination of the liner from a self-adhesive layer, activation of the liner or self-adhesive layer, transferral of the liner over the self-adhesive layer and re-lamination of the two components so as to produce the linerless self-adhesive material. The liner or the self-adhesive layer is coated with a thermo-adhesive that allows for permanent lamination of the liner located on the self-adhesive layer.

17 Claims, 5 Drawing Sheets

(51) Int. Cl.
    *G09F 3/10*    (2006.01)
    *C09J 7/35*    (2018.01)
    *B31D 1/02*    (2006.01)
    *B32B 37/00*   (2006.01)
    *B32B 37/06*   (2006.01)
    *B32B 37/12*   (2006.01)
    *B32B 43/00*   (2006.01)
    *C09J 133/00*  (2006.01)
    *C09J 175/04*  (2006.01)
    *C09J 177/00*  (2006.01)

(52) U.S. Cl.
    CPC ............ *G09F 3/10* (2013.01); *B31D 2201/02* (2013.01); *B32B 2519/00* (2013.01); *C09J 7/35* (2018.01); *C09J 2203/334* (2013.01); *C09J 2433/00* (2013.01); *C09J 2475/00* (2013.01); *C09J 2477/00* (2013.01); *G09F 2003/0232* (2013.01); *G09F 2003/0255* (2013.01); *Y10T 428/14* (2015.01)

(56) References Cited

U.S. PATENT DOCUMENTS

| | | |
|---|---|---|
| 5,435,963 A | 7/1995 | Rackovan et al. |
| 5,681,412 A * | 10/1997 | Nedblake ............... G09F 3/10 156/184 |
| 5,888,650 A | 3/1999 | Calhoun et al. |
| 6,357,941 B1 | 3/2002 | Amano et al. |
| 6,531,024 B1 | 3/2003 | Braun |
| 6,740,379 B1 * | 5/2004 | Congard ................ C09J 7/29 428/42.2 |
| 7,627,972 B2 | 12/2009 | Hodsdon et al. |
| 9,387,580 B1 * | 7/2016 | Reitano ................. B25G 1/102 |
| 2001/0006714 A1 * | 7/2001 | Bull ....................... B32B 27/36 428/40.1 |
| 2003/0008081 A1 | 1/2003 | Haase et al. |
| 2004/0081788 A1 * | 4/2004 | Sudofsky ................ C09J 7/22 428/40.1 |
| 2004/0250947 A1 * | 12/2004 | Phillips ................ B65C 9/1865 156/250 |
| 2008/0138556 A1 | 6/2008 | Emmert et al. |
| 2009/0169282 A1 | 7/2009 | Keeton |
| 2010/0300613 A1 | 12/2010 | Stogbauer et al. |

FOREIGN PATENT DOCUMENTS

| | | |
|---|---|---|
| EP | 0876960 A2 | 11/1998 |
| GB | 2469441 A | 10/2010 |
| WO | 1994/14605 A1 | 7/1994 |
| WO | 1996/16823 | 6/1996 |
| WO | 2004/114255 A2 | 12/2004 |
| WO | 2007/136767 A2 | 11/2007 |
| WO | 2009/136138 A1 | 11/2009 |
| WO | 2011/036347 A1 | 3/2011 |

\* cited by examiner

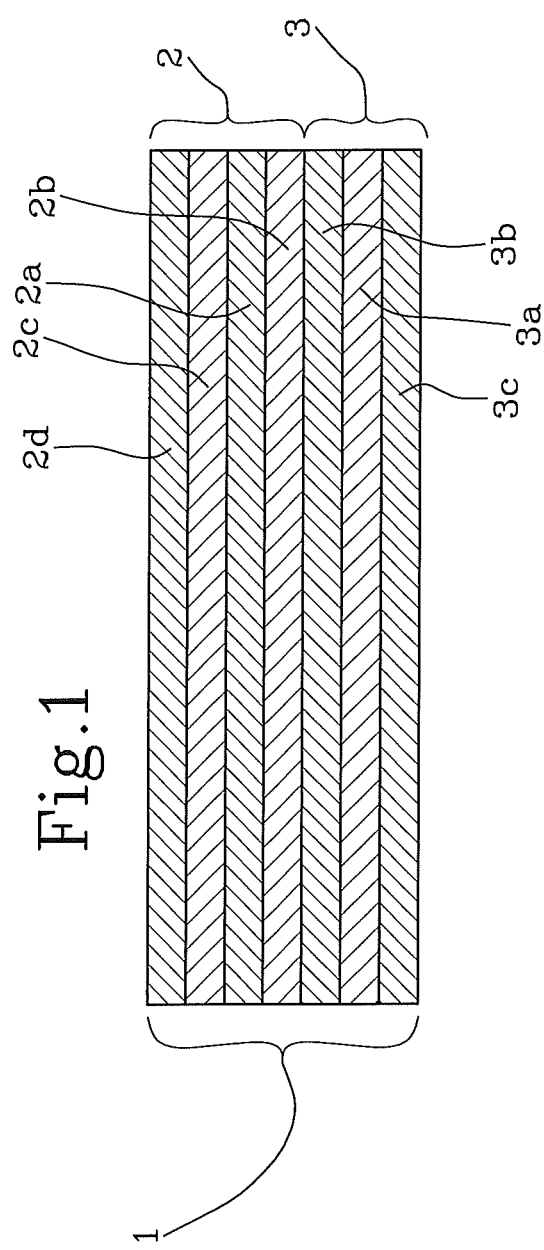
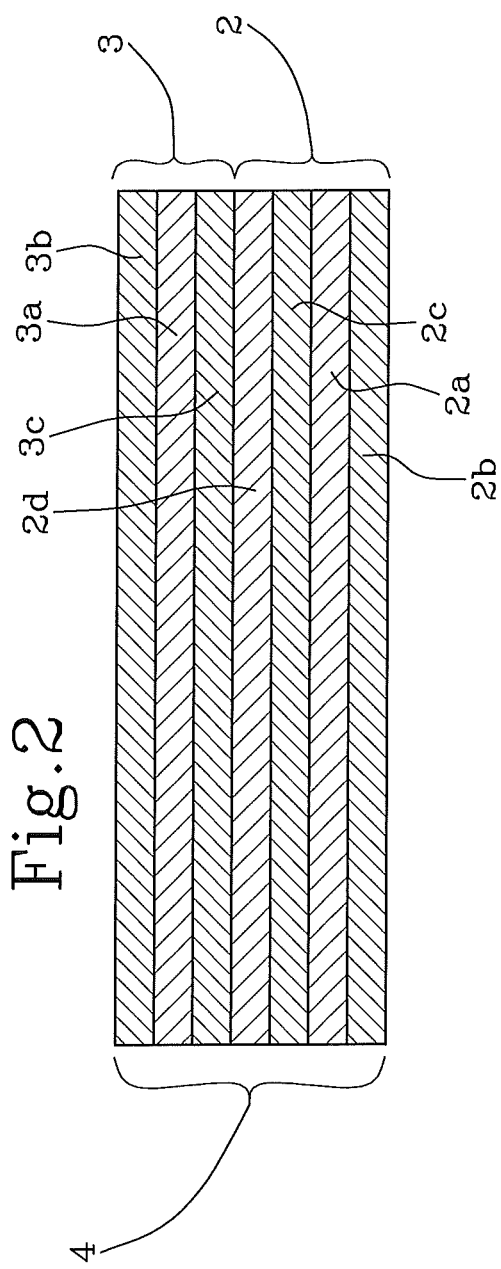

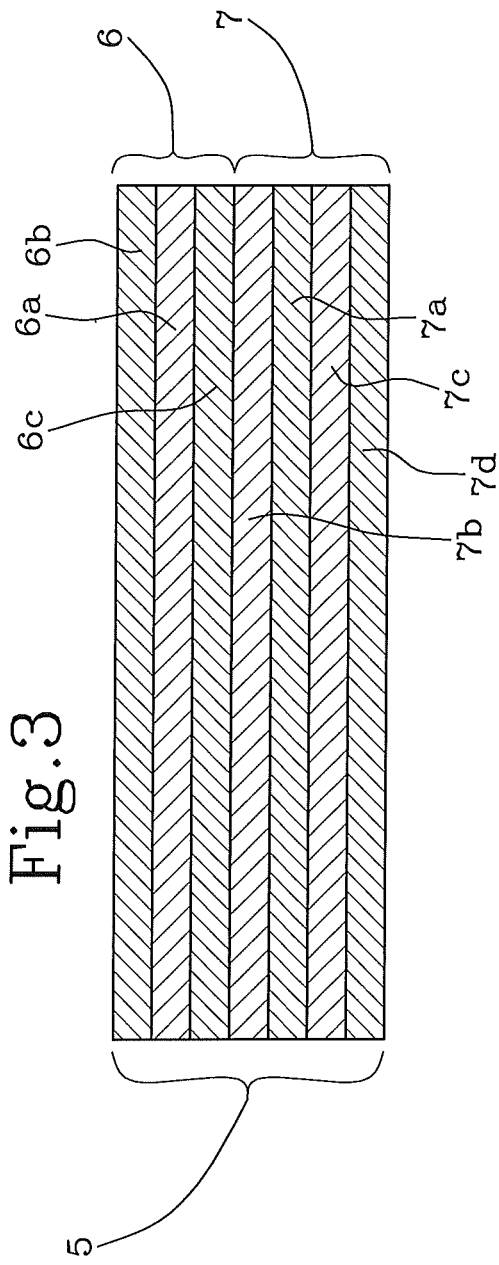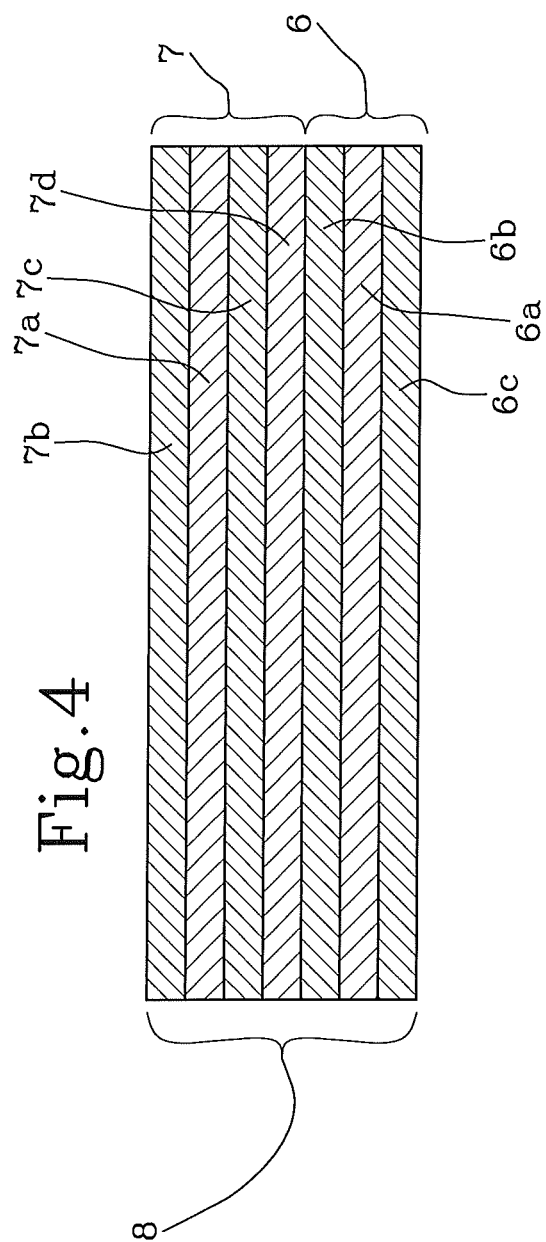

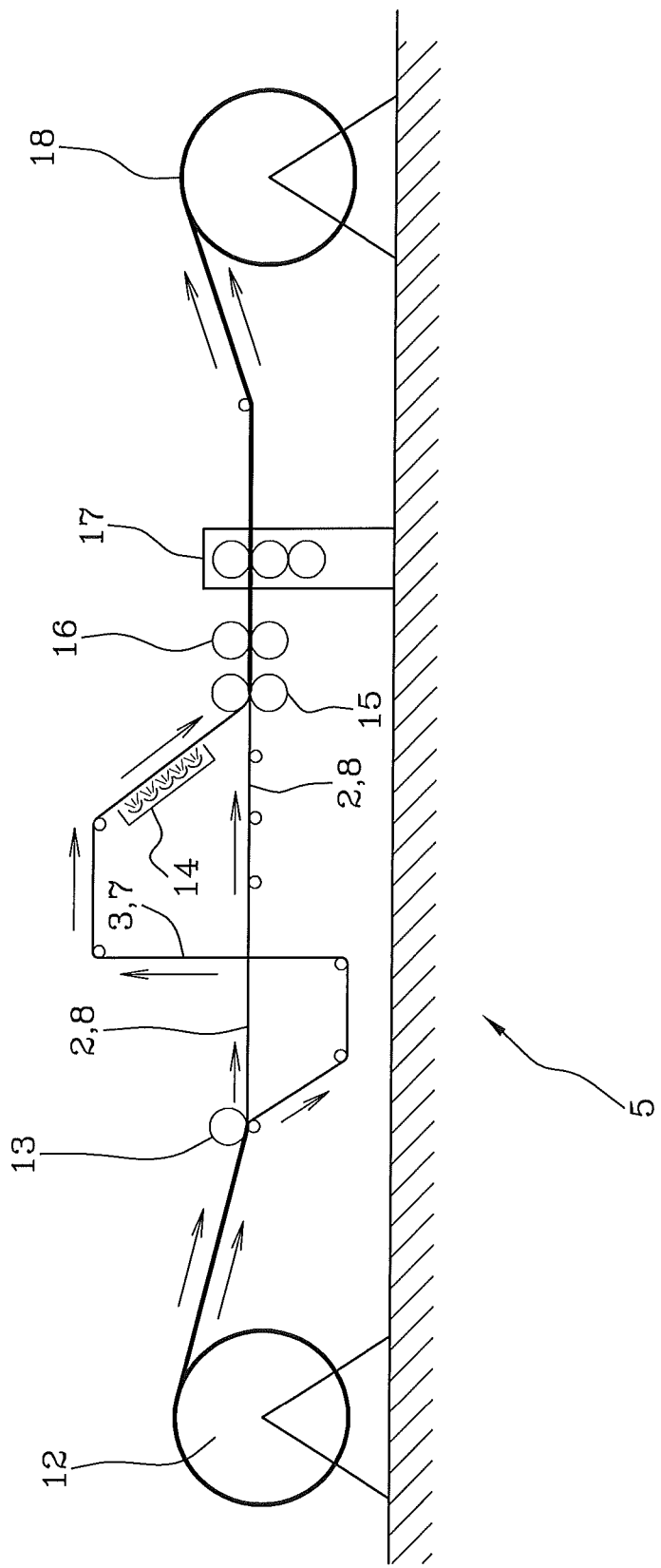

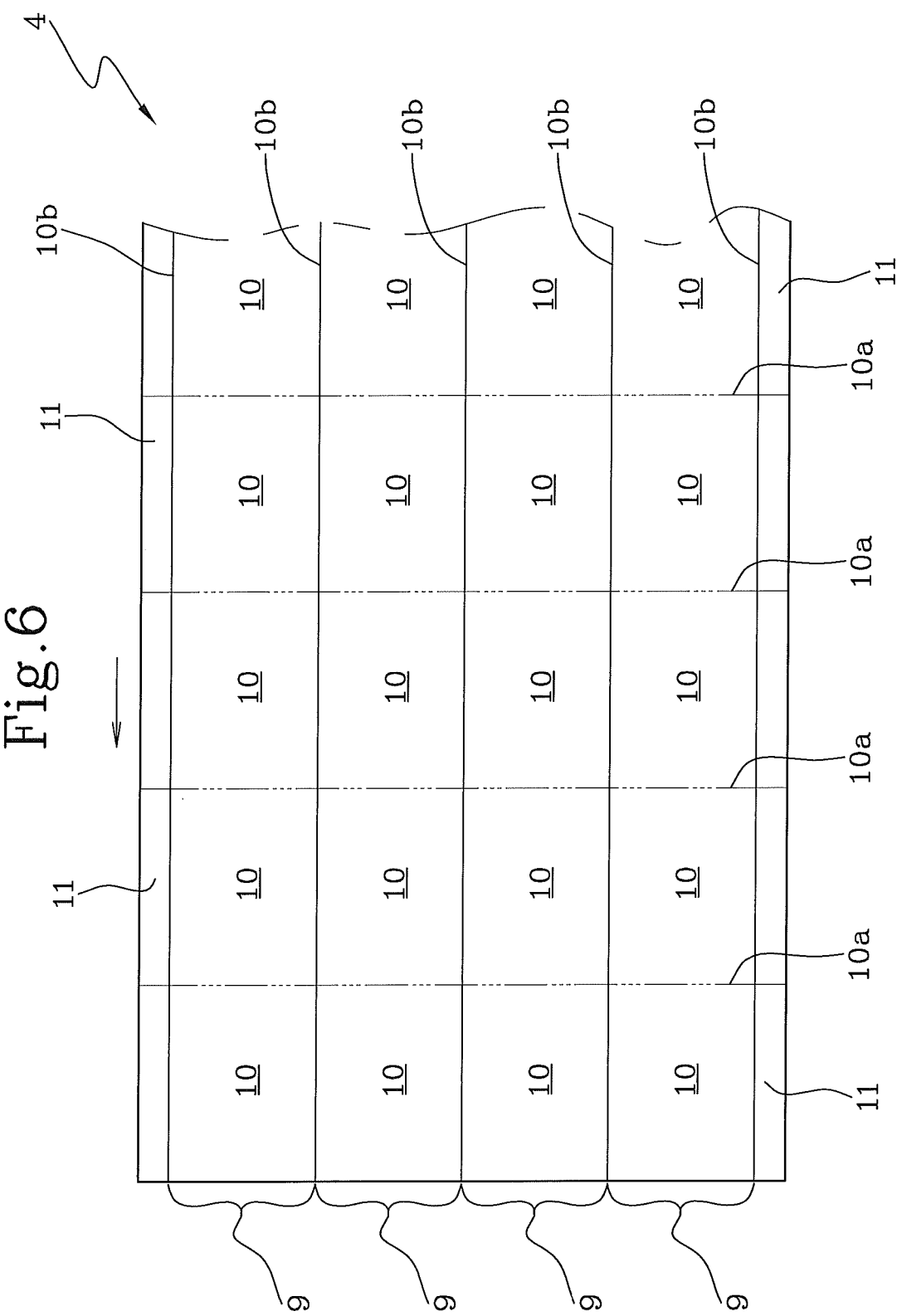

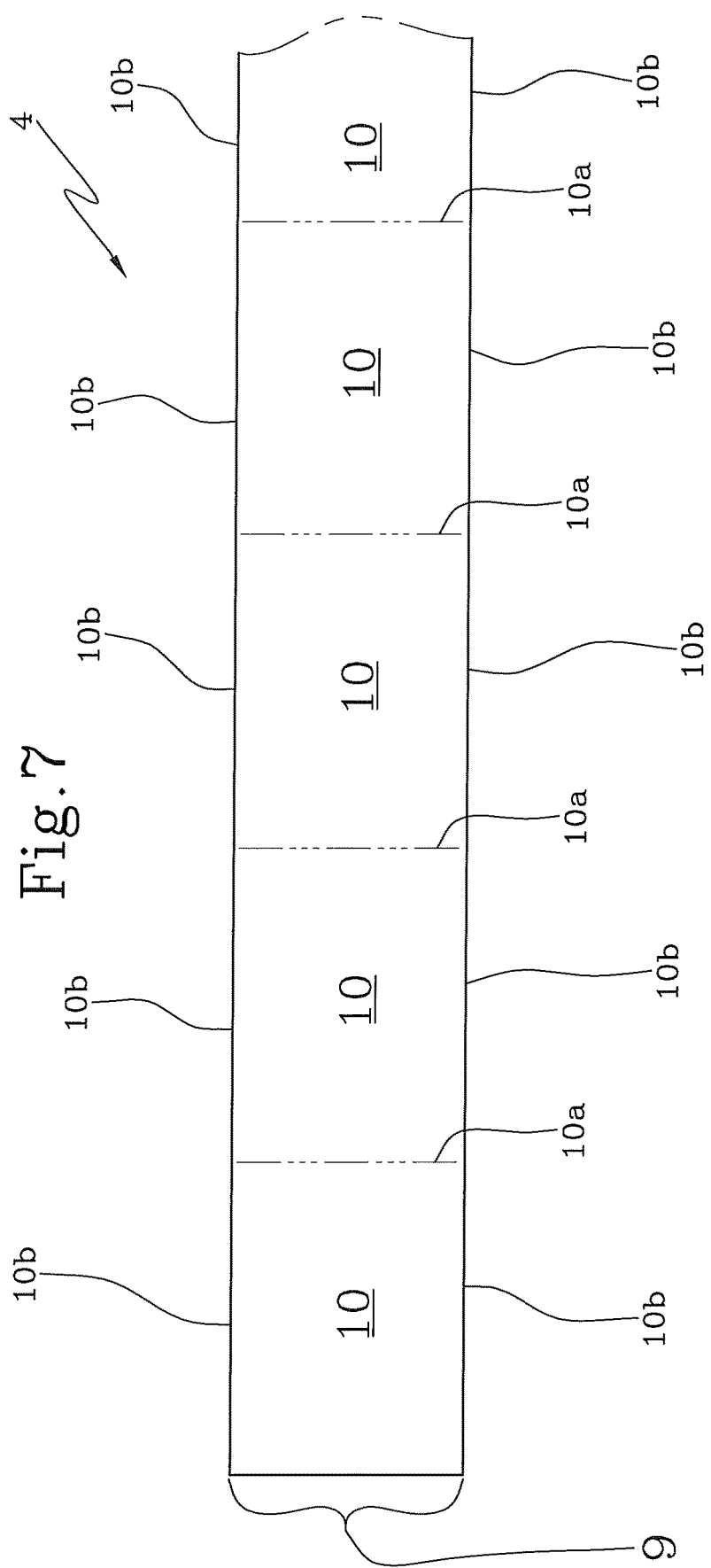

LINERLESS SELF-ADHESIVE MATERIAL

CROSS-REFERENCE TO RELATED APPLICATIONS

This application is a Divisional of U.S. patent application Ser. No. 14/392,189, filed Dec. 23, 2015, which is a 371 National Stage application of International PCT Application No. PCT/IB2014/062623, filed Jun. 26, 2014, and claims priority to Italian Patent Application No. MI2013A001087, filed Jun. 28, 2013, all of which are incorporated herein by reference in their entirety.

FIELD OF THE INVENTION

The object of the present invention is a process for obtaining a linerless self-adhesive material starting from a self-adhesive material having a support layer (liner). The invention also concerns a machine for realizing this process.

STATE OF THE ART

The so-called linerless self-adhesive labels are known in the sector of self-adhesive labels. These labels typically have a multi-layered construction comprising a substrate consisting of a polymeric material (for example polypropylene) coated with a non-stick material (i.e., a "release coating"), normally silicone, on one side, and with a pressure-sensitive adhesive (PSA) on the other side. A printed layer bearing the information one wishes to communicate to the end user, for example a logo, a design, a trademark and/or words, is normally applied between the substrate and the PSA.

This particular construction of the label does not require the presence of a support layer (i.e., a "liner" or "backing substrate") with the undeniable advantage of reducing scrap materials related to the process of labelling an item, with respect to the use of "conventional" labels, which instead include the presence of a support layer from which the self-adhesive label must be separated before it can be applied to a surface.

Aside from the advantage stated above consisting in markedly reducing the amount of scrap material to be disposed of, linerless self-adhesive labels also have several drawbacks principally related to the fact that, for the printer, they require a very costly printing machine, the operation of which is also complex.

On the other hand, "conventional" self-adhesive labels, that is, labels that include a support layer (i.e. a liner or backing substrate), typically have a multi-layered construction in which the substrate consisting of plastic material on which the printing is carried out, is coated with PSA on the surface opposite the printing surface. The adhesive layer is protected in the stage of non-use of the label by a liner normally constituted by a layer of plastic, paper, fabric or another material, and coated with a non-stick material (e.g. silicone), which is in contact with the PSA on the label. When the label is applied to a surface, the label is removed from the liner, leaving the layer of adhesive free and this adhesive layer will adhere to the application surface by pressing the label on this same surface. Once the label has been removed, the liner must be disposed of or recycled, if possible, for other uses. In both cases, the costs involved with possible disposal or recovery of the liner are clearly evident.

Within the scope of self-adhesive labels comprising a support layer, an attempt to solve the problem of disposal of the liner is known from the Brazilian patent application no. PI0902205-8.

In this patent application, a process is disclosed for obtaining tapes of self-adhesive labels or the like without a backing or protection tape (i.e., linerless), in which a tape of self-adhesive material constituted by a front layer of paper or plastic (e.g. BOPP, PVC, polyethylene, or polyester), a layer of PSA (e.g. hot melt or acrylic adhesive) and a liner made of transparent plastic that is silicone-coated on the side in contact with the PSA, is first unwound from a reel and then printed on the front plastic or paper side. An adhesive is then applied on the printed surface so as to form a tape of labels adhesivized on the surface. The nature of the adhesive utilized for this procedure is not specified in the description, where an adhesive commonly utilized in the sector to obtain permanent adhesion is generically discussed.

The liner is then separated from the tape of adhesivized labels, forming two tapes, one consisting of printed and adhesivized paper or plastic, the other being constituted by the liner. The liner is shifted laterally and repositioned over the tape of adhesivized labels, with the non-stick layer of silicone facing upwards and the layer of transparent plastic in contact with the tape of adhesivized labels. One then proceeds with the re-lamination of the liner, positioned as described, with the tape of printed and adhesivized labels, thereby obtaining a tape of labels without an actual support or protective layer, therefore without a liner (linerless). The process also comprises a final step of rewinding the tape of linerless labels obtained.

Although this type of process makes it possible to approach the issue of recovery and re-use of the liner, it does not appear to be easily practicable by printers, that is, by those entities that would have to implement the process. In fact, according to the teachings of PI0902205-8, printers would be would be faced with having to manage a process comprising a step of applying an adhesive (therefore a chemical compound normally of a polymeric nature) onto the printed surface of the tape of labels. For the printer, this entails the need to implement a series of safety procedures relating to the handling of "loose" chemical substances that are potentially harmful to the health of operators who come into contact with them, for which printers are normally not equipped and which in any case, it would involve investments in which not all printers may be interested.

Furthermore, as comprised by the process specified in PI0902205-8, the need to apply the adhesive directly on the front side of the tape of labels does not allow for operation at the production speeds at which one normally works in the label production and printing sector. The procedure of the prior art could thus represent the "bottleneck" of the entire system for labelling products, bringing about an overall slowing down of the production of printed labels.

Another drawback of the process of the prior art is represented by the fact that the printing of the label is carried out in line with the system for detaching-reattaching the liner. In fact, it is foreseeable that problems can arise in the case in which the printing carried out on the surface of the label does not reach the next step of direct application of the adhesive (an application that takes place precisely on the printed surface) under optimal conditions of dryness. Therefore, in this situation, alterations in the printing performed may occur (e.g. smearing, changes in colour, etc.), which would compromise the final appearance of the label.

As an alternative, should the need arise to have to slow down the process in order to achieve complete drying of the printing, this would involve a further slowdown of the entire process of production of the linerless label and thus of the entire chain of production of printed labels.

In addition to the above-mentioned drawbacks, it should be added that the process of the prior art does not provide a clear and precise teaching as relates to the type of adhesive that can be applied to the printed surface of the tape of labels, or regarding the conditions required to achieve the permanent lamination of the liner and the adhesivized tape of labels.

In light of the points discussed above, it is evident that in the sector of "conventional" self-adhesive labels, that is, labels that have an anti-stick support layer applied to the PSA, the problem of reducing the amount of scrap material to be disposed of (or possibly recycled) and thus the total costs related to the labelling process still needs to be faced and solved in an industrially applicable manner.

An aim of the present invention is thus to make available an industrially applicable process for producing a linerless self-adhesive material starting from a self-adhesive material with a liner and that makes it possible to solve the issue of cutting the costs of disposal of the liner and to overcome the drawbacks of the prior art stated hereinabove.

Given the practicality of application of the process of the invention, it becomes appealing and implementable in a simple manner and with limited costs by printers, that is, by the entities that, within the chain of production of labelling objects, figure as intermediaries between the producers of self-adhesive labels (with or without liners) and the end users of the labels, that is, the manufacturers of packaged products (e.g. in flacons, bottles or other forms of packaging) requiring labelling.

Moreover, the process of the invention makes it possible to prepare a linerless self-adhesive material, employing a total amount of material that is less than the normal amount. In fact, the thickness of the various layers making up the self-adhesive material obtained with the process of the invention is reduced compared to the normal thicknesses utilized in the sector. The material saved allows for a marked reduction of labelling costs.

Another aim of the invention is to make available a machine for executing the process of the invention and that makes it possible to produce a linerless self-adhesive material, starting from a self-adhesive material with a liner, continuously and at the speeds normally utilized in the self-adhesive label printing sector.

Another aim of the invention is to make available a self-adhesive material with a liner, to be used as a starting material for producing a linerless self-adhesive material by means of the process of the invention. The linerless self-adhesive material obtained/obtainable with the process of the invention also constitutes an object of the invention. The total thickness of the self-adhesive starting material with a liner and of the linerless material obtained with the process of the invention (as well as the thickness of the individual layers thereof) is less than the thicknesses of known self-adhesive materials. In fact, known self-adhesive materials with a liner have a front layer in the range of 50 µm to 100 µm, an adhesive layer of about 20 µm and a liner in the range of 23 to 70 µm. On the other hand, linerless self-adhesive materials, including both those known in the sector and the specific linerless self-adhesive material constituting the object of patent no. PI0902205-8, comprise a front layer of 30-50 µm and an adhesive layer of 20 µm. The self-adhesive material of the invention (both the starting material and the linerless material obtained upon completion of the process), however, comprises thicknesses of the various materials that are decidedly lower than those of the known materials. For example, both self-adhesive materials can comprise a front layer of 25 µm, an adhesive of 18 µm and a liner of 12 µm.

The possibility of achieving such reduced thicknesses allows for marked savings in terms of the overall costs of the process, as for example it is possible to load more material per loading unit on the label applicator machine.

SUMMARY OF THE INVENTION

The present invention concerns a process for producing a self-adhesive material without a support layer (i.e., linerless), starting from a self-adhesive material having a self-adhesive layer and a support layer (liner or backing substrate), comprising a step of detaching (or delaminating) the liner from the self-adhesive starting material, a step of activating the liner or alternatively, the self-adhesive layer (preferably of the front surface of the self-adhesive layer) to promote the adhesion thereof, a step of transferring the liner over the self-adhesive, said transfer being carried out before or after activation of the liner or the self-adhesive layer, and a step of re-attaching the liner to the self-adhesive layer. Activation of the liner or self-adhesive layer can be carried out before, after or during the step of re-attaching the liner to the self-adhesive layer. Preferably, the process also comprises an initial step of unwinding the self-adhesive material to be detached and a final step of rewinding the re-attached material onto a reel.

The invention also concerns a machine for producing a linerless self-adhesive material according to the process described hereinabove, and comprising means for performing the delamination of the liner from the self-adhesive layer, means for activating the liner or the self-adhesive layer, means for transferring the liner onto the self-adhesive layer (said means being located before or after the liner or self-adhesive layer activation means) and means for re-laminating the liner and the self-adhesive layer. The means for performing the activation of the thermo-adhesive are located before, after or at said means for re-laminating the liner and the self-adhesive layer. Preferably, the machine also comprises means for unwinding the reel of initial self-adhesive material with a liner and means for rewinding the final linerless self-adhesive material, obtained upon completion of the process.

In a preferred embodiment of the process of the invention, prior to being rewound onto the reel, the linerless self-adhesive material undergoes die cutting and/or microperforation, preferably, but not exclusively, using the system disclosed in patent application no. EP2185426 filed by CatchPoint Limited.

The linerless self-adhesive material obtained with the process of the invention is intended for application on objects to be labelled (e.g. containers of various types such as flacons, bottles, tubes, etc.), by means of any labelling machine (specifically for the application of linerless self-adhesive materials) known in the sector. A preferred, though not exclusive, example of a labelling machine that can be used for application of the linerless self-adhesive material of the invention is disclosed in patent application no. EP2407390 filed by Ilti S.r.l.

In a particularly preferred embodiment of the invention, the linerless self-adhesive material of the invention is die cut and/or microperforated using the system described in EP2185426 by CatchPoint Limited, prior to rewinding onto a reel, and then applied, in a subsequent step, by the end consumer (that is, the industrial concern that needs to label its products) onto the objects to be labelled, by means of the labelling machine of EP2407390 by Ilti S.r.l.

The invention also concerns a self-adhesive material used as the starting material for the process of the invention and comprising a self-adhesive layer of plastic or paper material coated with a pressure-sensitive adhesive (PSA) on one surface and with one or more layers of colour or a thermo-adhesive on the opposite surface, and a liner made of plastic material (preferably transparent) that is coated with a non-stick material on one surface and with a thermo-adhesive or one or more layers of colour on the opposite surface. The surface of the liner coated with the non-stick material is in contact with the PSA of the self-adhesive layer for the purpose of protecting this adhesive from any possible external contact. At least one of either the self-adhesive layer or the liner is coated with a thermo-adhesive on at least one of the surfaces thereof.

The invention also concerns a linerless self-adhesive material that can be obtained using the process of the invention, wherein the liner, initially used to protect the PSA from possible contact is applied on the self-adhesive layer in such a manner that the thermo-adhesive is located between the surface of the self-adhesive layer, said surface possibly being printed, (opposite the surface coated with the PSA), and the liner surface opposite the surface coated with the anti-stick agent, which is possibly printed, so as to realize permanent lamination and thus also protection of the possibly printed surface of the self-adhesive layer or liner.

In addition to being useful in cutting liner disposal costs, this particular construction of the linerless self-adhesive material makes it possible to achieve a surprising aesthetic effect, characterized by optimal definition of the printing, if present, and by a glossy effect that is very appealing to the end consumer of the labelled object.

Moreover, surprisingly, it has been found that after re-lamination of the liner and the self-adhesive layer, the thermo-adhesive remains stable at temperatures of up to 100° C. This is a definite advantage that makes it possible to transport and store the linerless self-adhesive material even at high temperatures without any alteration of the material.

The self-adhesive starting material with a liner and the linerless self-adhesive material obtained using the process of the invention are preferably both in the form of a tape, preferably wound on a reel.

The linerless self-adhesive material obtained using the process of the invention comprises a plurality of strips, each comprising a plurality of self-adhesive labels. Each self-adhesive label has two opposite microperforated sides and two opposite continuous sides. Along the continuous sides, the plurality of labels is subdivided into a plurality of strips by means of the die-cutting technique or by means of tangential cutting. Therefore, each strip comprises a plurality of labels joined together through opposite microperforated sides. The microperforation of the opposite sides of the plurality of labels allows for easy detachment of one label from the other, detachment which is performed by the labelling machine during application of the labels onto the objects to be labelled.

Therefore, an object of the invention is also a self-adhesive label that can be obtained starting from the linerless self-adhesive material of the invention according to the description provided hereinabove.

The process of the invention offers the advantage of overcoming the problem of the costs related to the disposal of the liner, making available a process that at the same time does not have the drawbacks of the prior art. In fact, the process of the invention does not require the use of "loose" chemical products, (which the adhesive in PI0902205-8 does require), to be applied by the printer; the printer is instead provided with a process (and a machine) that is easily carried out without requiring the implementation of special safety measures for handling "loose" chemical compounds.

In fact, the printer receives a roll of self-adhesive material that includes a liner having the particular construction of the invention, in which a layer of thermo-adhesive is applied directly on the surface of the liner opposite the surface coated with the silicone polymer, or in an alternative embodiment, the printer receives a roll of self-adhesive material in which a layer of thermo-adhesive is applied directly on the surface of the self-adhesive layer opposite the surface coated with PSA. In both cases, if the end user of the self-adhesive material (that is, the industrial concern that needs to label its products) needs to have a design, logo, trademark and/or words stamped on the self-adhesive material, the printer will proceed to carry out the printing with a conventional or digital printing machine. Depending upon the embodiment, the printer will have the printing carried out on the self-adhesive layer in the case in which the thermo-adhesive is applied on the liner, or the printing will be carried out on the surface of the liner opposite the surface coated with the anti-stick agent, optionally treated with physical and/or chemical treatment so as to predispose it for printing.

Upon completion of printing, the printed self-adhesive material can be loaded on the machine of the invention and undergo the liner delamination and re-lamination process as described hereinabove, without the need to apply adhesive chemical products, as the thermo-adhesive is applied directly on one of the two surfaces of the liner or on the front surface of the self-adhesive layer.

Therefore, the printer can carry out the process of the invention at the production speeds normally adopted in the sector for labelling objects, without having to slow down the process due to the need to apply an adhesive or wait until definitive re-lamination takes place between the liner and the self-adhesive layer, which instead needs to be done in the case of the process of PI0902205-8. Moreover, in the case in which printing the self-adhesive material or the liner is not an in-line process (unlike the case of the prior art), but, if carried out, it is performed by a conventional printing machine prior to starting the process of the invention, there are none of the drawbacks of the prior art, for example relating to the need to slow down the process of delamination/re-lamination for the purpose of waiting for proper drying of the printing to take place or in any case, "smearing" or changes in the printing colours owing to the application of an adhesive directly on a printed surface that has not dried completely.

BRIEF DESCRIPTION OF THE FIGURES

The invention is described in detail here below also with reference to the attached figures, in which:

FIG. 1 shows a sectional view of an embodiment of the self-adhesive material with a support layer (liner) used as the starting material for the process of the invention;

FIG. 2 shows a sectional view of the linerless self-adhesive material obtained upon completion of the process of the invention, using the self-adhesive starting material of FIG. 1;

FIG. 3 shows a sectional view of an embodiment of the self-adhesive material with the support layer (liner) used as the starting material for the process of the invention;

FIG. 4 shows a sectional view of the linerless self-adhesive material obtained upon completion of the process of the invention, using the self-adhesive starting material of FIG. 3;

FIG. 5 shows a scheme of the machine for executing the process of the invention;

FIG. 6 shows a top view of a linerless self-adhesive material after microperforation, obtained using the process of the invention and comprising a plurality of strips, each comprising a plurality of self-adhesive labels, FIG. 7 shows a strip of linerless self-adhesive material, after microperforation and die cutting or tangential cutting, obtained using the process of the invention.

DETAILED DESCRIPTION OF THE INVENTION

The self-adhesive material used as the starting material for the process of the invention, comprises:
- a self-adhesive layer comprising a film made of plastic or paper material having a front surface, optionally coated (or laminated) with a thermo-adhesive, and a surface, opposite the front surface, coated (or laminated) with a pressure-sensitive adhesive (PSA);
and, in contact with the PSA,
- a support layer (or protective layer or liner or backing substrate) comprising a film made of plastic material (preferably transparent) coated (or laminated) with a non-stick material on the surface in contact with the PSA, and optionally coated with a thermo-adhesive on the other surface (that is, on the surface opposite the surface coated with the non-stick material).

In the self-adhesive material described above, at least one of either the front surface of the self-adhesive layer or the surface of the support layer opposite the surface coated with the anti-stick material is coated with a thermo-adhesive.

The plastic material of the self-adhesive layer is preferably chosen from among a polyolefin, e.g. polyethylene (PE), or polypropylene (PP), e.g. bi-oriented polypropylene (BOPP), polyesters, e.g. polyethylene terephthalate (PET), polyvinyl chloride (PVC), and mixtures thereof. For example the plastic material of the self-adhesive layer can consist of a co-extruded film made of two or more of the listed polymers. The thickness of the plastic material of the self-adhesive layer ranges between 10 and 100 μm, preferably between 12 and 50 μm, varying according to the type of plastic material utilized.

In the case in which a paper material is used for the self-adhesive layer, it is preferably chosen from among uncoated, coated and laid paper stocks. The weight of the paper material ranges between 50 and 100 g.

The plastic material and the paper material can both be transparent, coloured and/or metallic.

The pressure-sensitive adhesive (PSA) preferably consists of a (solvent-based, water-based or UV) acrylic adhesive or a solvent-based or hot-melt natural and/or synthetic rubber adhesive. These are adhesives that are normally utilized in the self-adhesive label sector.

A thermo-adhesive can be applied on the front surface opposite the surface coated with the PSA.

The liner of the self-adhesive material comprises a film made of plastic material preferably chosen from among PET and PP. The thickness of the film ranges between 9 and 60 μm, preferably between 12 and 50 μm.

The non-stick material used to coat one of the two liner surfaces preferably consists of a silicone resin (water-based, solvent-based or "solventless", heat or UV reticulated).

A thermo-adhesive can be applied on the opposite surface of the liner (with respect to the surface coated with the non-stick material).

The thermo-adhesive applied on the self-adhesive layer or on the liner is preferably chosen from among a polyamide lacquer, a polyurethane lacquer and an acrylic lacquer.

The thermo-adhesive has the particular characteristic of not having adhesive properties at ambient temperature, whereas it becomes adhesive only after activation by heating. This particularity represents an advantage in that problems do not occur with exposure of adhesive substances externally during the steps of manipulating the self-adhesive starting material. Furthermore, during the process of the invention, the thermo-adhesive is activated before, after or during re-lamination of the self-adhesive layer and the liner; therefore problems related to possible adherence of this adhesive to the components of the machine do not arise.

Moreover, the definite advantage of this particular configuration of the liner or the self-adhesive layer (which bear a thermo-adhesive already applied to one of the two surfaces thereof) is that of making the entire production process simple and quick for the printer to apply, and the printer is not forced to have to "handle" loose chemical substances (unlike the case of the prior art process).

Therefore, an object of the invention is constituted by a liner for self-adhesive materials having the particular construction described above, that is, comprising a thermo-adhesive applied directly on the surface opposite the surface coated with the anti-stick material.

An object of the invention is also constituted by a self-adhesive layer having the particular construction described above, that is, comprising a thermo-adhesive applied directly on the front surface of the self-adhesive layer.

In a preferred embodiment, the self-adhesive material used as the starting point for the process of the invention comprises an additional layer, which is applied over the front surface of the self-adhesive layer, or over the surface of the liner opposite the surface coated with the non-stick material, said additional layer comprising a printing adhesion promoter, e.g. an acrylic or polyurethane emulsion.

In addition to being chemically treated with the emulsion described above, the front surface of the self-adhesive layer, or the surface of the liner opposite the surface coated with the non-stick agent, can preferably also be treated physically by corona or flame treatment (known in the field) preferably carried out prior to the chemical treatment, or it can be treated only with chemical treatment or only with physical treatment. The physical treatment is aimed at increasing the surface tension of the front surface with the intention of promoting subsequent adhesion of the printing inks. At least one of either the front surface of the self-adhesive layer or the liner surface opposite the surface coated with the anti-stick material is treated physically and/or chemically, whereas the thermo-adhesive is applied to the other surface.

In a preferred embodiment, the self-adhesive material used as the starting material for the process of the invention also comprises a printing layer, in turn comprising one or more layers of colour/ink, depending upon the words, logo, design or trademark that one wishes to affix. The printing layer can be a complete or partial layer.

In one embodiment, this printing layer is applied onto the front surface (chemically and/or physically treated as described above, or untreated) by the printer, using a specific conventional or digital printing machine. In this case, the thermo-adhesive is applied on the liner surface opposite the surface coated with the anti-stick agent.

In an alternative embodiment, this printing layer is applied on the liner, particularly on the surface of the liner opposite the surface coated with the anti-stick agent (chemically and/or physically treated as described above or untreated) by the printer, using a conventional or digital printing machine. In this case, the thermo-adhesive is applied on the front surface of the self-adhesive layer.

This particular latter configuration, in which the printing is applied to the liner (rather than to the self-adhesive layer), is particularly useful should the printer want to maximize the brilliance of metallic inks (e.g. a silver colour), which, owing to their nature, must be deposited directly on the plastic film by reverse printing. Any layers of colour will be affixed over the metallic ink.

Printing the self-adhesive material may not take place in line with the process of the invention, but it can be carried out with a conventional or digital printing machine differing from the machine used to implement the process of the invention. The advantages of this configuration of the process have been described above.

Alternatively, printing in the two manners described above can instead be carried out in line with the process of the invention, that is, in a step preceding delamination of the self-adhesive layer from the liner.

The self-adhesive material used as the starting material for the process of the invention is preferably in the form of a continuous tape, preferably wound onto a reel.

FIG. 1 attached hereto describes a particularly preferred embodiment of the self-adhesive material used as the starting material for the process of the invention. FIG. 1 shows a sectional view of the material, which is preferably in the form of a continuous tape wound onto a reel.

In FIG. 1, the self-adhesive starting material to be loaded on the machine of the invention to carry out the process of the invention is indicated as a whole by the number 1. The number 2 indicates the overall self-adhesive layer, while number 3 indicates the liner as a whole.

The self-adhesive layer comprises a film made of plastic or paper material (PE, PET; PP; PVC, coated, uncoated or laid paper stocks) 2a having a front surface that has been treated with chemical and/or physical treatment 2c (i.e., with the application of an acrylic and/or polyurethane emulsion and/or with corona or flame treatment), capable of promoting adhesion of the printing, a printing layer 2d applied on the treated front surface, and a pressure-sensitive adhesive (PSA; e.g. acrylic-based) 2b applied on the surface opposite the front surface.

As stated hereinabove, the printing and the chemical and/or physical treatment of the surface may also not take place. In any case, the printing layer, if present, is applied by the printer (and not by the manufacturer of the self-adhesive material) preferably off line with respect to the process of the invention; it is also possible to perform printing in line with respect to the process.

The liner 3 comprises a transparent film 3a made of PET or PP that is coated with a layer of silicone 3b on one surface, and with a thermo-adhesive 3c on the opposite surface, said thermo-adhesive being chosen from among a polyamide lacquer, a polyurethane lacquer or an acrylic lacquer.

FIG. 3 shows an alternative embodiment of the self-adhesive starting material of the invention. FIG. 3 shows a sectional view of the material, which is preferably in the form of a continuous tape wound on a reel.

In FIG. 3, the self-adhesive starting material to be loaded on the machine of the invention in order to carry out the process of the invention is indicated as a whole by the number 5. The number 6 indicates the self-adhesive layer as a whole, whereas the number 7 indicates the liner as a whole.

The self-adhesive layer comprises a film made of plastic or paper material (PE, PET; PP; PVC, coated, uncoated or laid paper stocks) 6a having a front surface coated with a thermo-adhesive 6b chosen from among a polyamide lacquer, a polyurethane lacquer or an acrylic lacquer, and a pressure-sensitive adhesive (PSA) 6c, e.g. acrylic-based, applied on the surface opposite the front surface.

The liner 7 comprises a transparent film 7a made of PET or PP and it is coated on one surface with a layer of silicone 7b; the opposite surface is treated with a chemical and/or physical treatment 7c (i.e., with the application of an acrylic and/or polyurethane emulsion and/or a corona or flame treatment), which is capable of promoting adhesion of the printing; a printing layer 7d is applied on the treated surface of the liner.

As stated above, printing and chemical and/or physical treatment of the surface do not necessarily have to take place. In any case, the printing layer, if present, is applied by the printer (and not by the manufacturer of the self-adhesive material), preferably off line with respect to the process of the invention; it is also possible to perform in-line printing with respect to the process.

Conventional techniques are used for production of the self-adhesive material to be loaded on the machine of the invention, such conventional techniques including, for example, coating and lamination or other techniques normally applied in the manufacturing sector of self-adhesive materials.

In particular, an adhesion promoter for the printing ink can be applied on the front surface of the plastic or paper film of the self-adhesive layer (chemical treatment), after prior physical treatment of the surface (corona or flame treatment) to increase the surface tension of the plastic or paper. Alternatively, a thermo-adhesive can be applied on the front surface by means of coating or lamination for example. The adhesive (PSA) is then applied on the opposite surface by means of coating, for example.

The liner is produced by applying, on the plastic film of the liner: an anti-stick material (e.g. silicone) on one side and the thermo-adhesive, by coating for example, on the other side. The anti-stick material and the thermo-adhesive can be solvent-based or water-based and as such, they are applied, for example, by coating, on the opposite surfaces of the plastic film.

Alternatively, rather than applying the thermo-adhesive, physical and/or chemical treatment can be carried out on the liner surface opposite the surface coated with the anti-stick material, that is, an acrylic and/or polyurethane emulsion can be applied by lamination or coating, and/or corona or flame treatment can be performed.

The liner can be purchased already made or it can be produced in line, that is, on the same machine used for the production of the self-adhesive layer, or produced off line (i.e., on a different machine).

Lastly, one proceeds with lamination of the liner, which has been treated on both surfaces, and with lamination of the self-adhesive layer, with the adhesive in the middle, thereby obtaining a single product that is re-wound onto the reel (semi-finished).

Preferably, the single product of the reel thus obtained can be subsequently cut on other machines so as to transform it into shorter and narrower rolls, as required by the client.

As mentioned above, in the case in which the front surface of the self-adhesive layer, or the liner surface opposite the surface coated with the anti-stick material, is printed (entirely or partially), the printing is carried out by means of a conventional printing machine, by the printer (i.e., the printing establishment) that purchases the reels of self-adhesive material with the liner, obtained as described hereinabove.

In particular, the printer loads a reel of self-adhesive material with the liner onto the printing machine, unwinds it and applies one or more layers of ink as needed to obtain the required design, logo or words, on the front surface or alternatively, on the liner surface (both surfaces being treated or not treated physically and/or chemically) opposite the surface coated with anti-stick material. Lastly, the printed material is rewound onto the reel.

The self-adhesive material with the liner, printed or not printed (depending upon the needs of the end consumer), and preferably wound on the reel, is used as the self-adhesive starting material to produce the linerless self-adhesive material by means of the process of the invention.

According to the process of the invention, the liner, which is constructed as described above, is easily separated (detached or delaminated) from the PSA, with which it is in contact, owing to the anti-stick and releasing properties of the anti-stick material (e.g. silicone). After detachment, the liner or the self-adhesive layer undergoes a step of activation of the thermo-adhesive and then the liner is transferred onto the self-adhesive layer so that the liner surface, which is optionally coated with the activated thermo-adhesive, comes into contact with the front surface of the self-adhesive layer, which is optionally coated with the thermo-adhesive. The liner can also be transferred onto the self-adhesive layer prior to activation of the liner. The step of activating the thermo-adhesive can be carried out before, after or during re-lamination of the liner with the self-adhesive layer.

Activation of the thermo-adhesive takes place by heating to a temperature comprised between 70 and 120° C., preferably between 80 and 100° C. Heating is preferably carried out using a heating device, for example an oven or a lamp or an IR lamp, a heated roller or UV lamps.

At least one (entire or partial) printing layer, that is, one or more layers of colour forming the desired design, logo, trademark and/or words, may possibly be present on the front surface of the self-adhesive layer, or on the liner surface opposite the surface coated with the anti-stick agent. The front surface or the liner surface opposite the surface coated with the anti-stick agent can also preferably be treated with a physical and/or chemical treatment prior to printing, as described above.

The liner and the self-adhesive layer are then re-laminated, permanently, in a construction that is substantially inverted with respect to the initial construction, thus forming a self-adhesive material that can be defined as linerless. In fact, the final construction of the self-adhesive material that is achievable using the process of the invention is such that the surface of the self-adhesive layer coated with the PSA and the surface of the starting liner coated with anti-stick material are both facing outwards in an opposite direction.

In this configuration, the layer of thermo-adhesive is in permanent contact with the front surface of the self-adhesive layer and with the liner surface opposite the surface coated with the anti-stick material.

FIG. 2 shows an embodiment of the final construction of the linerless self-adhesive material produced using the process of the invention starting from the initial self-adhesive material appearing in FIG. 1.

The linerless self-adhesive material of the invention is indicated as a whole by the number 4, whereas the liner is indicated as a whole by the number 3 and the self-adhesive layer is indicated as a whole by the number 2.

The distinctive "inverted" construction of the final material can be noted in FIG. 2. From its original position in contact with the PSA 2b, the layer of anti-stick material 3b is now found in the final construction facing outwards. The same can be observed also in the case of the PSA adhesive layer 2b, which, instead of being in contact with the anti-stick material 3b, as in the final construction, is now facing outwards in an opposite direction with respect to the anti-stick material 3b.

The plastic or paper film 2a of the self-adhesive layer, which has been treated with a physical and/or chemical treatment 2c, and printed 2d, is in direct and permanent contact with the thermo-adhesive 3c of the plastic film 3a of the liner.

The layer consisting of anti-stick material 3b and the PSA adhesive layer 2b are then set in contact with each other in the last step of the process, in which this linerless self-adhesive material is preferably rewound onto the reel.

In this manner, the contact between the adhesive PSA and the anti-stick material enables easy unwinding of the reel of self-adhesive material in the subsequent step of labelling the objects to be labelled (e.g. flacons, bottles, tubes, etc.), owing precisely to the anti-stick and releasing characteristics specific to the anti-stick material, which preferably consists of a silicone polymer.

Moreover, this configuration allows for controlled detachment of the PSA from the anti-stick surface, thus enabling the use of a high speed in the subsequent step of labelling the items.

Furthermore, shifting the liner on the front surface of the printed self-adhesive layer allows for protection of the printing and a particular glossy effect and printing resolution that is highly appreciated by consumers.

FIG. 4 shows another embodiment of the final construction of the linerless self-adhesive material produced using the process of the invention starting from the initial self-adhesive material appearing in FIG. 3.

The linerless self-adhesive material of the invention is indicated as a whole by the number 8, whereas the liner is indicated as a whole by the number 7 and the self-adhesive layer is indicated as a whole by the number 6.

The distinctive "inverted" construction of the final material can be noted in FIG. 4. From its original position in contact with the PSA 6c, the layer of anti-stick material 7b is now found in the final construction facing outwards. The same can be observed also in the case of the PSA adhesive layer 6c, which, instead of being in contact with the anti-stick material 7b, as in the initial construction, is now facing outwards in an opposite direction with respect to the anti-stick material 7b.

The plastic or paper film 6a of the self-adhesive layer, which is coated with the thermo-adhesive 6b, is in direct and permanent contact with the plastic film 7a of the liner, which has been treated with a physical and/or chemical treatment 7c, and printed 7d.

The layer consisting of anti-stick material 7b and the PSA adhesive layer 2b are then set in contact with each other in the last step of the process, in which this linerless self-adhesive material is preferably rewound onto the reel.

In this manner, the contact between the PSA and the anti-stick material enables easy unwinding of the reel of self-adhesive material in the subsequent step of labelling the objects to be labelled (e.g. flacons, bottles, tubes, etc.), owing precisely to the anti-stick and releasing characteristics specific to the anti-stick material, which preferably consists of a silicone polymer.

Moreover, this configuration allows for controlled detachment of the PSA from the anti-stick surface, thus enabling the use of a high speed in the subsequent step of labelling the items.

Furthermore, transferral of the liner on the front surface of the printed self-adhesive layer allows for protection of the printing and a particular glossy effect and printing resolution that is highly appreciated by consumers In a preferred embodiment of the invention, the linerless self-adhesive material is cooled before it is rewound on the reel and after the re-lamination step.

The linerless self-adhesive material produced upon completion of the process is preferably in the form of a linerless self-adhesive tape comprising a plurality of self-adhesive strips, each comprising a plurality of self-adhesive labels.

In a preferred embodiment, prior to being rewound onto the reel and after possible cooling, the linerless self-adhesive material undergoes a step of microperforation and/or die cutting, preferably carried out using the system described in the patent application EP2185426 filed by CatchPoint Limited.

The microperforated self-adhesive material appears as in the example shown in FIG. 6.

The linerless self-adhesive material obtained upon completion of the process (for example, as shown in cross section in FIG. 2, but it could also consist of the linerless self-adhesive material 8 shown in FIG. 4) is indicated by the number 4. It is a frontal view.

The linerless self-adhesive material 4 comprises a plurality of strips, each of which is indicated as a whole by the number 9. Each strip comprises a plurality of linerless self-adhesive labels 10.

Each label has two opposite sides 10a that have been microperforated for example by means of the microperforation technique described in the CatchPoint patent application, and two continuous opposite sides 10b that represent the dividing line between one strip and another.

The number 11 instead indicates the skeleton of the labels (which can also be present between the strips). The skeleton is eliminated before rewinding on the reel and following the separation into a number of strips, possibly salvaging it on a specific winder. This is the only scrap existing in the process of the invention. When microperforation is carried out (or in a preceding or subsequent step), the linerless self-adhesive material is also subdivided into strips preferably by die cutting or tangential cutting along the opposite continuous sides 10b of the self-adhesive labels.

An example of a microperforated and die-cut linerless self-adhesive strip is indicated in FIG. 7 by the number 9. The strip 9 is obtained for example by die-cutting the plurality of self-adhesive strips represented in FIG. 6. The strip shown in FIG. 7 comprises a plurality of labels 10 comprising two opposite microperforated sides 10a and two opposite continuous sides 10b.

The presence of microperforations along two opposite sides of the label considerably facilitates easy application of the individual labels on the objects to be labelled, given that the procedure for separating the individual labels from the tape of self-adhesive material is facilitated immensely.

Lastly, one proceeds with winding the individual strips of self-adhesive material onto a reel, winding them separately on plastic or cardboard cores with a controlled tension.

The linerless self-adhesive material, in the form of strips, is applied on the objects to be labelled with specific labelling machines capable of detaching the individual labels that make up the material. An example of labelling machines of this type is described in patent application no. EP2407390 filed by Ilti S.r.l. Labelling is particularly effective when in addition to the Ilti machine, the linerless self-adhesive material undergoes microperforation using the CatchPoint system.

An object of the invention is also constituted by a linerless self-adhesive material obtained using the procedure of the invention in the form of a tape comprising a plurality of self-adhesive strips, each comprising a plurality of self-adhesive labels, as represented in FIG. 6 for example.

An object of the invention is also constituted by a strip of linerless self-adhesive material obtained after microperforation and die cutting or tangential cutting of a tape of linerless self-adhesive material, as shown in FIG. 7 for example.

An object of the invention is also constituted by a linerless self-adhesive label obtainable from a self-adhesive strip by separation along the microperforated sides, which is normally carried out by a labelling machine.

An object of the invention is also constituted by an object labelled with the linerless self-adhesive label of the invention.

The process of the invention is carried out using a specially designed machine that comprises, as reported above, means for performing the delamination of the liner from the self-adhesive layer, means for performing the activation of the thermo-adhesive, means for transferring the liner onto the self-adhesive layer and located before or after said thermo-adhesive activation means, and means for re-laminating the liner and the self-adhesive layer.

The means for activating the thermo-adhesive is located before, after or at said means for re-laminating the liner and the self-adhesive layer.

The machine preferably also comprises means for unwinding the reel of self-adhesive material with the initial liner and means for rewinding the final linerless self-adhesive material, obtained at the end of the process, in which said means for activating the thermo-adhesive is located before, after or at said means for re-laminating the liner and the self-adhesive layer.

The means for activating the thermo-adhesive preferably consists of heating means, such as an oven or IR or UV lamp or a heated roller. The means for performing the delamination of the liner from the self-adhesive layer preferably comprises rollers capable of unwinding the self-adhesive material and separating the liner from the self-adhesive layer.

The means for re-laminating the self-adhesive layer with the liner placed over it comprises laminating rollers.

The machine of the invention can also preferably comprise means for cooling the re-laminated material, said cooling means preferably consisting of cooling rollers.

In a particularly preferred embodiment of the invention, the machine of the invention also comprises in-line means for microperforating and subdividing the linerless self-adhesive material into strips.

As in the case of the initial printing, the labelling of the items is carried out off line, with respect to the process of the invention (i.e., on separate machines).

FIG. 5 shows an example of a machine for carrying out the process of the invention. The machine is indicated as a whole by the number 5.

The machine comprises an unwinder 12, on the shaft of which the roll of the self-adhesive starting material with a liner is loaded, possibly printed previously in line or off line.

With controlled tension, the self-adhesive material is unwound and at the same time the liner 3; 7 and the self-adhesive layer 2; 8 are separated (delamination) by the delamination rollers 13. The two layers then proceed separately, each with its own tension control.

The thermo-adhesive is heated by means of a heating system 4 until it reaches its activation temperature.

With the configuration described above, the two layers are laminated by the lamination unit 15, comprising two or more rollers, some possibly thermostated, so as to keep the thermo-adhesive at the proper temperature. The lamination pressure is controlled.

The laminated product is immediately cooled by the cooling unit 16, which comprises two or more rollers.

Once cooled, the product is passed into the die-cutting and microperforation unit 17 where it is die-cut and microperforated. The division thereof into a number of strips, according to the size of the label, is carried out in this step.

At this point, if necessary, the skeleton can be eliminated, salvaging it on a specific winder.

The various strips of self-adhesive material thus obtained are then wound on a specific winder 18, separately on plastic or cardboard cores, with controlled tension and without incorporating air between the various turns.

Lastly, the self-adhesive material obtained, preferably in the form of a strip, comprising a plurality of linerless self-adhesive labels, is applied on the product to be labelled, off line, by means of a labelling machine, such as the labelling machine of the Ilti company (step not shown in figure).

The invention claimed is:

1. Self-adhesive material comprising:
   a) a self-adhesive layer comprising a film made of plastic or paper material having a front surface and a surface, opposite the front one, wherein the surface opposite the front one is coated with a pressure-sensitive adhesive, PSA;
   and, in contact with the PSA, a
   b) a support layer (liner) comprising a film made of plastic material having a surface in contact with the PSA and another surface opposite to the surface in contact with the PSA, wherein the surface in contact with the PSA is coated with a non-stick material;
   wherein the said opposite surface to the one coated with the non-stick material of the film made of plastic material of the support layer, is coated with a thermo-adhesive; and
   wherein the plastic material of the self-adhesive layer is selected from the group consisting of polyethylene (PE), polypropylene (PP), polyesters, and mixtures thereof.

2. Self-adhesive material according to claim 1, further comprising a total or partial printing layer, comprising one or more layers of color, said printing layer being applied on the front surface of the self-adhesive layer.

3. Linerless self-adhesive material comprising:
   a) a film made of plastic material, comprising a surface facing outwards coated with a non-stick material and a surface opposite the one facing outwards;
   b) a self-adhesive layer comprising a film made of plastic or paper material having a front surface and a surface, opposite the front one and facing outwards, coated with a pressure-sensitive adhesive, PSA;
   wherein said front surface of the film made of plastic or paper material of the self-adhesive layer and said opposite surface to the one coated with the non-stick material of the film made of plastic material, are in permanent contact through a thermo-adhesive; and
   wherein the plastic material of the self-adhesive layer is selected from the group consisting of polyethylene (PE), polypropylene (PP), polyesters, and mixtures thereof.

4. Linerless self-adhesive material according to claim 3 having the form of a self-adhesive tape comprising a plurality of strips, each comprising a plurality of labels.

5. Linerless self-adhesive material according to claim 4, wherein each label comprises two opposite microperforated sides and two opposite continuous sides.

6. Linerless self-adhesive material according to claim 5, in the form of a strip comprising a plurality of labels, obtainable through die cutting or tangential cutting along the continuous sides of the labels from the linerless self-adhesive material in the form of a tape.

7. Linerless self-adhesive label obtainable from the self-adhesive material according to claim 6 through separation from the strip of self-adhesive material along the microperforated sides.

8. Self-adhesive material according to claim 3, wherein said polypropylene (PP) is bi-oriented polypropylene (BOPP) and said polyesters is a polyethylene terephthalate (PET) polyester.

9. Self-adhesive material according to claim 8, wherein said plastic material of the self-adhesive layer is bi-oriented polypropylene (BOPP).

10. Self-adhesive material according to claim 8, wherein said plastic material of the self-adhesive layer is polyethylene terephthalate (PET).

11. Self-adhesive material comprising:
    a) a self-adhesive layer comprising a film made of plastic or paper material having a front surface and a surface, opposite the front one, wherein the surface opposite the front one is coated with a pressure-sensitive adhesive, PSA;
    and, in contact with the PSA, a
    b) a support layer (liner) comprising a film made of plastic material having a surface in contact with the PSA and another surface opposite to the surface in contact with the PSA, wherein the surface in contact with the PSA is coated with a non-stick material;
    wherein the front surface of the film made of plastic or paper material of the self-adhesive layer is coated with a thermo-adhesive;
    wherein the plastic material of the self-adhesive layer is selected from the group consisting of polyethylene (PE), polypropylene (PP), polyesters, and mixtures thereof;
    wherein the opposite surface of the support layer to the one coated with the non-stick material is coated with a total or partial printing layer, comprising one or more layers of color
    wherein the support layer is transparent and made of polyethyleneterephthalate (PET) or polypropylene (PP); and
    wherein the opposite surface of the support layer to the one coated with the non-stick material is treated with a chemical and/or physical treatment which is capable of promoting adhesion of the printing.

12. Self-adhesive material according to claim 11, wherein said thermo-adhesive is chosen from: a polyamide lacquer, a polyurethane lacquer and an acrylic lacquer.

13. Self-adhesive material according to claim 11, in the form of a continuous self-adhesive tape.

14. Self-adhesive material according to claim 11, wherein, in the support layer, the surface opposite to the surface in contact with the PSA is coated with a thermo-adhesive.

15. Self-adhesive material according to claim 11, wherein said polypropylene (PP) is bi-oriented polypropylene (BOPP) and said polyesters is a polyethylene terephthalate (PET) polyester.

16. Self-adhesive material according to claim 15, wherein said plastic material of the self-adhesive layer is hi-oriented polypropylene (BOPP).

17. Self-adhesive material according to claim 15, wherein said plastic material of the self-adhesive layer is polyethylene terephthalate (PET).

\* \* \* \* \*